United States Patent
Stacey

(10) Patent No.: US 11,592,348 B2
(45) Date of Patent: Feb. 28, 2023

(54) SYSTEM AND METHOD FOR MEASURING VOLUME AND PRESSURE

(71) Applicant: Haemonetics Corporation, Boston, MA (US)

(72) Inventor: Gary Stacey, Marshfield, MA (US)

(73) Assignee: Haemonetics Corporation, Boston, MA (US)

( * ) Notice: Subject to any disclaimer, the term of this patent is extended or adjusted under 35 U.S.C. 154(b) by 84 days.

(21) Appl. No.: 17/351,042

(22) Filed: Jun. 17, 2021

(65) Prior Publication Data

US 2021/0310887 A1    Oct. 7, 2021

Related U.S. Application Data

(63) Continuation of application No. 15/769,179, filed as application No. PCT/US2016/059017 on Oct. 27, 2016, now abandoned.

(60) Provisional application No. 62/246,795, filed on Oct. 27, 2015.

(51) Int. Cl.
| | |
|---|---|
| *G01L 11/02* | (2006.01) |
| *G01F 23/292* | (2006.01) |
| *G01L 19/00* | (2006.01) |
| *G01F 22/02* | (2006.01) |

(52) U.S. Cl.
CPC ............ *G01L 11/02* (2013.01); *G01F 23/292* (2013.01); *G01L 19/0092* (2013.01); *G01F 22/02* (2013.01)

(58) Field of Classification Search
CPC .... G01L 11/02; G01L 19/0092; G01F 23/292; G01F 22/02
See application file for complete search history.

(56) References Cited

U.S. PATENT DOCUMENTS

| | | | |
|---|---|---|---|
| 5,670,720 | A | 9/1997 | Clark et al. |
| 6,494,344 | B1 | 12/2002 | Kressel, Sr. |
| 2005/0242117 | A1 | 11/2005 | Yoshida et al. |
| 2007/0125170 | A1 | 6/2007 | Tenney |
| 2007/0177778 | A1 | 8/2007 | Massaro |
| 2007/0262076 | A1 | 11/2007 | Johnson |
| 2007/0262531 | A1 | 11/2007 | Jorgensen et al. |

(Continued)

FOREIGN PATENT DOCUMENTS

| | | |
|---|---|---|
| DE | 198 00 131 | 5/1999 |
| KR | 10-2007-0037783 | 4/2007 |

OTHER PUBLICATIONS

United States Patent and Trademark Office as the International Searching Authority, Authorized Officer: Shane Thomas, International Search Report and Written Opinion of the International Searching Authority, PCT/US16/59017, dated Feb. 28, 2017, 21 pages.

*Primary Examiner* — David Z Huang
(74) *Attorney, Agent, or Firm* — Sunstein LLP

(57) ABSTRACT

A volume measurement system for a fluid processing device includes a fluid container, an imaging unit, and a controller. The container includes a housing defining the structure of the fluid container, and a plurality of fluid chambers. The fluid chambers collect and/or store fluid from the fluid processing device, and each have a port that allows fluid to enter and/or exit the fluid chambers. The imaging unit takes images of the fluid chambers and is positioned to view a level of fluid in each of the chambers. The controller is in communication with the imaging unit and determines the volume of fluid within each of the fluid chambers based upon the viewed level of fluid in the fluid chambers.

41 Claims, 4 Drawing Sheets

(56) References Cited

U.S. PATENT DOCUMENTS

| | | |
|---|---|---|
| 2009/0134046 A1 | 5/2009 | Breidenthal et al. |
| 2011/0067490 A1 | 3/2011 | Walsh et al. |
| 2011/0098590 A1 | 4/2011 | Garbutt et al. |
| 2013/0036824 A1 | 2/2013 | Chung et al. |
| 2014/0103478 A1 | 4/2014 | Usuda et al. |

SYSTEM AND METHOD FOR MEASURING VOLUME AND PRESSURE

PRIORITY

This patent application is a continuation of U.S. patent application Ser. No. 15/769,179, which is based on International Application No. PCT/US16/59017 filed Oct. 27, 2016, which claims priority from U.S. Provisional Patent Application No. 62/246,795, filed Oct. 27, 2015. The disclosures of all these applications is incorporated herein, in their entirety, by reference.

TECHNICAL FIELD present invention relates to measuring fluid volumes and pressures, and more particularly to an imaging system for measuring fluid volumes and pressures.

BACKGROUND ART

During various fluid processing procedures, such as apheresis procedures, it is important to measure both the volume of fluids collected/processed, as well as the various pressures throughout the fluid processing system. It is common to measure the volume of fluid in a disposable bag or bottle using a strain gauge load cell. This technique is effective but has several problems. For example, if the load cell or the bag/bottle hanging from the load cell are bumped, the measurement may be impacted, causing measurement errors. Additionally, if the bump (or other contact) is significant enough to create an over stress on the load cell, the load cell may permanently shift from the zero position, which, in turn, disables the device.

Furthermore, if multiple containers need to weighed, system set up and loading may become labor intensive, as the correct bag/container needs to be hung on the appropriate load cell to avoid errors in measurement and fluid processing. Also, the tubes connected to the bags/containers need to be positioned in a way that they do not drag on surfaces causing incorrect measurements. Additionally, because each container needs a separate load cell, the cost increases significantly as additional containers are added to the system.

With respect to pressure measurement, current systems commonly use pressure transducers isolated by a filter to measure pressures within fluid lines. The filter provides a sterile barrier and prevents fluid and contaminates from touching the transducer. However, any leakage in the filter/transducer assembly (e.g., between the output of the filter and the transducer) will allow the fluid to contact the filter material which negatively impacts the accuracy of the pressure measurement and, effectively, disables the pressure measurement system. Additionally, in a manner similar to the volume measurement, when multiple pressure measurements are needed, system set-up and loading may become labor intensive, and the cost of the system increases significantly (e.g., because each pressure measurement will require a separate transducer).

SUMMARY OF THE EMBODIMENTS

In accordance with one embodiment of the invention, a volume measurement system for a fluid processing device includes a fluid container, an imaging unit and a controller. The fluid container may include a fluid container housing that defines the structure of the fluid container, and a plurality of fluid chambers within the fluid container housing. The fluid chambers may be configured to collect and/or store fluid from the fluid processing device, and each of the fluid chambers may have a port that allows fluid to enter or exit the fluid chamber. The imaging unit may take images of the fluid chambers and may be positioned to view a level of fluid in each of the fluid chambers. The controller may be in communication with the imaging unit and may determine a volume of fluid within each of the fluid chambers based upon the viewed level of fluid in each fluid chamber.

In some embodiments, the system may also include a housing (e.g., a system housing) that defines the structure of the volume measurement system. The imaging unit and controller may be located within the housing, and at least a portion of a first wall of the system housing may be transparent to allow the imaging unit to view the fluid container and take the images. The system/housing may include an opaque cover that holds the fluid container in place when closed. For example, the fluid container may be located between the opaque cover and the first wall when installed in the volume measurement system.

The imaging unit may include a camera that takes the images of the plurality of fluid chambers, and a light source that is directed at the fluid container. The light source may illuminate the fluid chambers to allow the camera to take the images of the fluid chambers. The imaging unit may be a solid state imager and/or include a wide angle lens. The imaging unit and/or controller may be part of the fluid processing device.

The fluid container may also include a plurality of pressure chambers within the housing. Each of the pressure chambers may have a chamber volume that is fluidly connectable with a fluid flow line within the fluid processing device. The fluid/pressure within the flow line may compress the chamber volume when fluidly connected. Each of the pressure chambers may include a tube having an open end and a closed end. The tube may define the chamber volume, and the chamber volume may be fluidly connectable with the fluid flow line via the open end. The inner diameter of the tube may be dependent on a target pressure range for the pressure chamber. Additionally, the imaging unit may take images of the plurality of pressure chambers, and the controller may determine a pressure level within the pressure chambers based on the image of the pressure chambers. The controller may use a look-up table to determine the pressure level and/or volume of fluid.

The housing of the fluid container may include a first and second sheet of flexible material that are secured together to form the fluid chambers and/or the pressure chambers. For example the first and second sheets of material may be PVC and RF welded together. Additionally or alternatively, the housing may have a plurality of reference marks on each of the fluid chambers that provide an indication of a fluid level in each of the fluid chambers. In such embodiments, the fluid level may be related to the volume of fluid within the fluid chamber. The fluid container may have perforations that allow the fluid chambers and/or pressure chambers to be separated from one another. One or more of the fluid chambers may be V-shaped.

In accordance with additional embodiments, a method of measuring a volume of fluid within a fluid container may include providing a fluid container having a plurality of fluid chambers and fluidly connecting each of the fluid chambers to a fluid line on the fluid processing system via a port on the fluid chambers. The fluid container may also include a fluid container housing defining the structure of the fluid container. The fluid chambers may be within the housing and configured to collect and/or store fluid from the fluid processing system. The ports may allow fluid to enter or exit each of the fluid chambers. The method may also include installing the fluid container into a volume measurement device. The volume measurement device may have an imaging unit that takes images of the fluid chambers and is positioned to view a level of fluid in each of the fluid chambers. The method may then image each of the fluid chambers using the imaging unit, and determine, using a controller in communication with the imaging unit, a volume of fluid within each of the fluid chambers based upon the images of the fluid chambers.

The volume measurement device may include a system housing defining the structure of the volume measurement device. The imaging unit and controller may be located within the housing, and at least a portion of a first wall of the system housing may be clear to allow the imaging unit to view the fluid container and take the images. The system housing may also have an opaque cover, and installing the fluid container into the volume measurement device may include closing the opaque cover over the fluid container to secure the fluid container within the volume measurement device.

The imaging unit may include (1) a camera configured to take the images of the fluid chambers, and (2) a light source directed at the fluid container and configured to illuminate the fluid chambers to allow the camera to take the images of the fluid chambers. The imaging unit may be a solid state imager and/or include a wide angle lens. The volume measurement device may be part of the fluid processing system.

In some embodiments, the fluid container may include a plurality of pressure chambers within the housing and having chamber volumes. In such embodiments, the method may include fluidly connecting each of the pressure chambers to a fluid flow line within the fluid processing system, such that a pressure/fluid within the flow line compresses the chamber volume. Additionally, the method may image each of the pressure chambers using the imaging unit, and determine, using the controller, a pressure level within each of the pressure chambers based on the image of the pressure chamber.

Each of the pressure chambers may include a tube with an open end and a closed end. The tube may define the chamber volume, and the chamber volume may be in fluid communication with the fluid flow line via the open end. The inner diameter of the tube may be dependent on a target pressure range for the pressure chamber. The controller may use a look-up table to determine the pressure level within each of the pressure chambers.

The fluid container housing may include a first sheet and second sheet of flexible material (e.g., PVC) that are secured together (e.g., via RF welding) to form the plurality of fluid chambers and/or pressure chambers. The housing may have plurality of reference marks on each of the fluid chambers that provide an indication of the fluid level in each of the fluid chambers. The fluid level may be related to a volume of fluid within the fluid chamber.

In accordance with still further embodiments, a fluid container for a fluid processing system includes a housing defining the structure of the fluid container, a plurality of fluid chambers within the housing, and a plurality of pressure chambers within the housing. The fluid chambers may collect and/or store fluid from the fluid processing system, and each fluid chamber may have a port that allows fluid to enter or exit each of the fluid chambers. Each of the pressure chambers may have a chamber volume and may be fluidly connectable with a fluid flow line within the fluid processing system, such that a pressure/fluid within the flow line compresses the chamber volume when fluidly connected. Additionally or alternatively, each of the pressure chambers may have a tube with an open end and a closed end. The tube(s) may define the chamber volume, and the chamber volume may be in fluid communication with the fluid flow line via the open end. The inner diameter of the tube may be dependent on a target pressure range for the pressure chamber.

The housing may include a first and second sheet of flexible material (e.g. PVC) that are secured together (e.g., via RF welding) to form the plurality of fluid chambers and plurality of pressure chambers. The housing may also include reference marks on each of the fluid chambers. The reference marks may provide an indication of a fluid level in each of the fluid chambers. The fluid level in each of the fluid chambers may be related to a volume of fluid within the fluid chamber. One or more of the fluid chambers may be V-shaped.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

In illustrative embodiments, a volume and pressure measurement system is able to measure a volume of fluid within a fluid container by taking an image of the fluid container. Additionally, various embodiments are able to measure a pressure within a pressure chamber by similarly taking an image of the pressure chamber. The pressure may correspond to a pressure within a fluid line of a fluid processing system to which the fluid container is connected.

Figure 1:
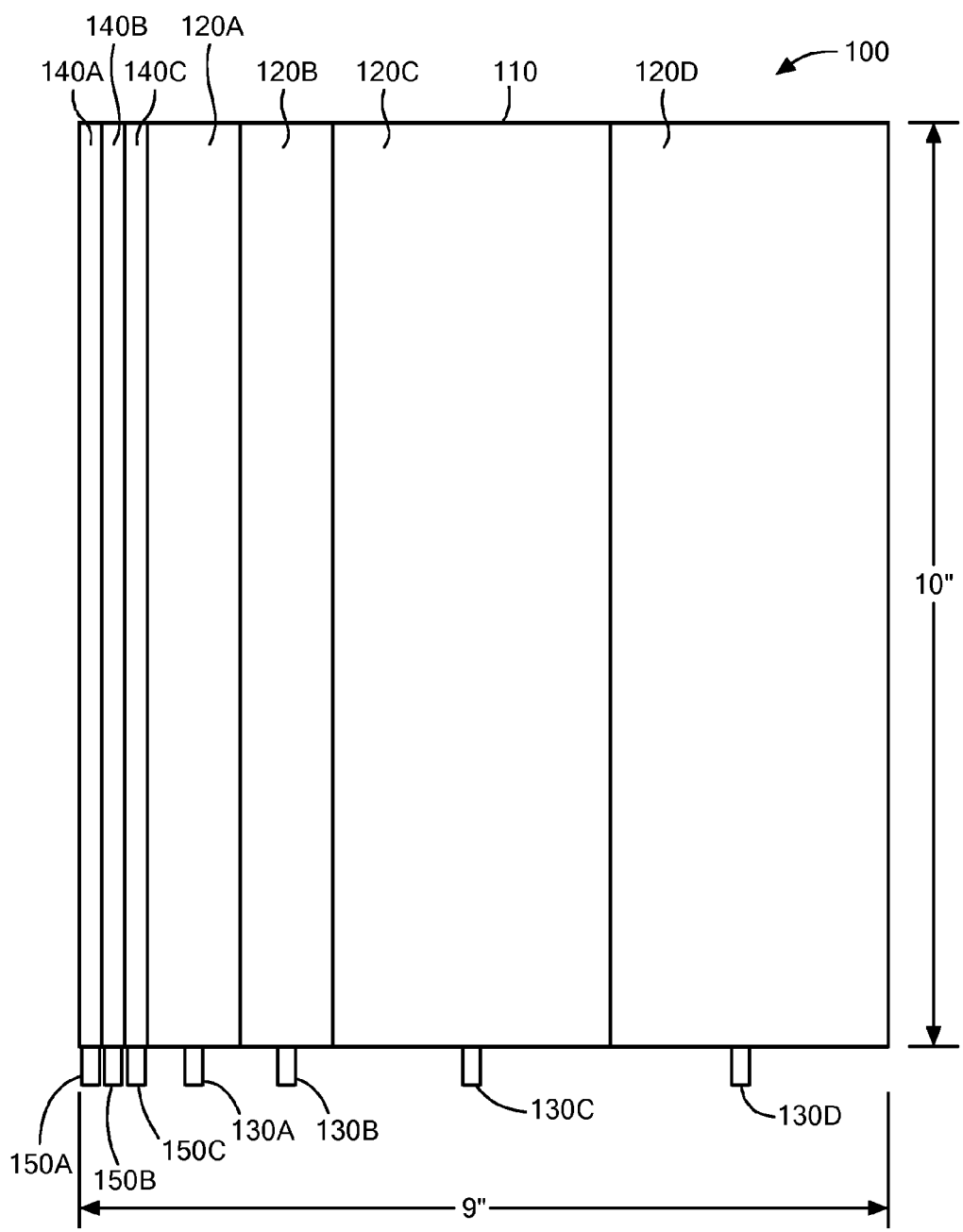
FIG. 1 schematically shows a cross-sectional view of a fluid bag in accordance with embodiments of the present invention.

FIG. 1 schematically shows a cross section of a fluid container 100 for use with the volume and pressure measurement system, in accordance with embodiments of the present invention. The fluid container 100 has a housing 110 that defines the structure of the container 100. The housing 110 may be constructed from two sheets of PVC material that are secured to one another (e.g., via RF welding) to form the container. In this manner, the container may be constructed in a manner similar to a disposable fluid or blood bag used with an apheresis and other blood processing system.

To allow the container 100 to collect and/or store more than one type of fluid, the container 100 may contain a number of fluid chambers/bags 120A-D. Each of these chambers/bags 120A-D may have at least one port 130A-D (e.g., an inlet, an outlet, or an inlet and an outlet) to allow fluid to be collected within or withdrawn from the chamber 120A-D (discussed in greater detail below). In use, each of the ports 130A-D may be fluidly connected to a fluid processing system. For example, if the fluid processing system is a blood processing system (e.g., an apheresis system), the ports 130A-D may be fluidly connected to a blood component separation device within the blood processing system and/or to one or more fluid transfer lines. As discussed in greater detail below, when fluidly connected in this manner, some of the fluid chambers 120A-D may be used to collect processed fluids/blood components (e.g., plasma, platelets, etc.). To improve the low volume accuracy, one or more of the fluid chambers 120A-D may be V-shaped so that the fluid level within the chamber 120A-D increases more significantly when only small volume of fluid is within the chamber 120A-D (e.g., such that a small increase in fluid volume significantly increases the height of the fluid level).

In addition to the fluid chambers 120A-D, as shown in FIG. 1, some embodiments of the fluid container 100 may also contain one or more pressure chambers 140A-C that, as discussed in greater detail below, may be used to measure the pressure within one or more of the fluid lines of the fluid processing system. Like the fluid chambers/bags 120A-D, each of the pressure chambers 140A-C may have a port 150A-C that, in turn, can be fluidly connected to the fluid processing system. For example, each port 150A-C of the pressure chambers 140A-C may be fluidly connected (e.g., via a section of tubing and a connector) to a fluid line within the fluid processing device.

As noted above, the pressure chambers 140A-C may be used to measure the pressure within the lines of the fluid processing system (e.g. the pressure within the line to which the individual pressure chamber 140A-C is fluidly connected). To that end, the pressure chambers 140A-C may contain a volume of air that compresses as the pressure within the fluidly connected line increases, and expands as the pressure decreases. For example, as fluid flows through the lines of the fluid processing system, a small volume of fluid will flow into the line connecting the pressure chamber 140A-C and the fluid processing device and into the pressure chamber 140A-C. As the pressure within the fluid line increases and decreases, the fluid level within the pressure chamber 140A-C (e.g., from the small volume of fluid that flows in) will similarly go up and down. The volume and pressure measurement system may then monitor the fluid level within each pressure chamber 140A-C to determine the pressure within the fluid line (discussed in greater detail below).

It should be noted that, depending on the material used to form the container 100, the container 100 material may be too pliable to allow for accurate pressure measurement (e.g., it may deform as the pressure increases). Therefore, in some embodiments, the pressure chamber 140A-C may include a section of semi-rigid tubing (not shown) that extends the length of the pressure chamber 140A-C and defines the volume of air (e.g., the internal diameter of the tubing may define the volume of air). In such embodiments, the tubing may be RF welded within the pressure chamber 140A-C and may have a closed/sealed top end and an open opposing/bottom end (e.g., to allow the fluid to enter the pressure chamber 140A-C). The open end of the tubing may form the port 150A-C that is fluidly connected to the fluid processing system. Alternatively, the port 150A-C may be connected/secured to the open end of the tubing.

In some embodiments, it may be necessary to measure pressures across a variety of ranges (e.g., the required pressure range for one pressure chamber 140A-C may be greater/less than the required pressure range for another pressure chamber 140A-C). To accommodate varying pressure ranges, the size of the pressure chamber 140A-C and/or the semi-rigid tubing may be adjusted up or down. For example, if the required pressure range/scale is relatively large (e.g., the pressure within the fluid line is relatively high), tubing having a larger inner diameter may be used (to create a larger volume of air). Conversely, if the pressure range/scale is relatively low (e.g., the pressure within the fluid line is low), tubing having a smaller inner diameter (to create a smaller volume of air) may be used. Additionally, the length of the tubing (e.g., the height of the pressure chamber 140A-C) may be adjusted to get the desired pressure level and sensitivity (e.g., the length of the semi-rigid tube may be increased to increase the pressure range or decreased to reduce the pressure range).

In some applications, it may be necessary or desirable to separate the individual fluid chambers 120A-D from one another and from the pressure chambers 140A-C (and separate the pressure chambers 140A-C from one another). To that end, some embodiments of the fluid container may include perforations that separate each of the fluid chambers 120A-D from one another, and from each of the pressure chambers 140A-C. This allows the user to remove individual fluid chambers 120A-D as needed (e.g., after fluid processing). It should also be noted that, although FIG. 1 shows a fluid container 100 having three pressure chambers 140A-C and four fluid chambers 120A-D, other embodiments may have more or less pressure chambers 140A-C and fluid chambers 120A-C (e.g., depending on the application/fluid processing procedure). For example, the fluid container 100 have less than three (e.g., from 0-2) or more than three (4 or more) pressure chambers 140A-C. Similarly, the fluid container 100 may have less than four fluid chambers 120A-D (e.g., from 0-3) or more than four fluid chambers 120A-D (5 or more).

Figure 2:
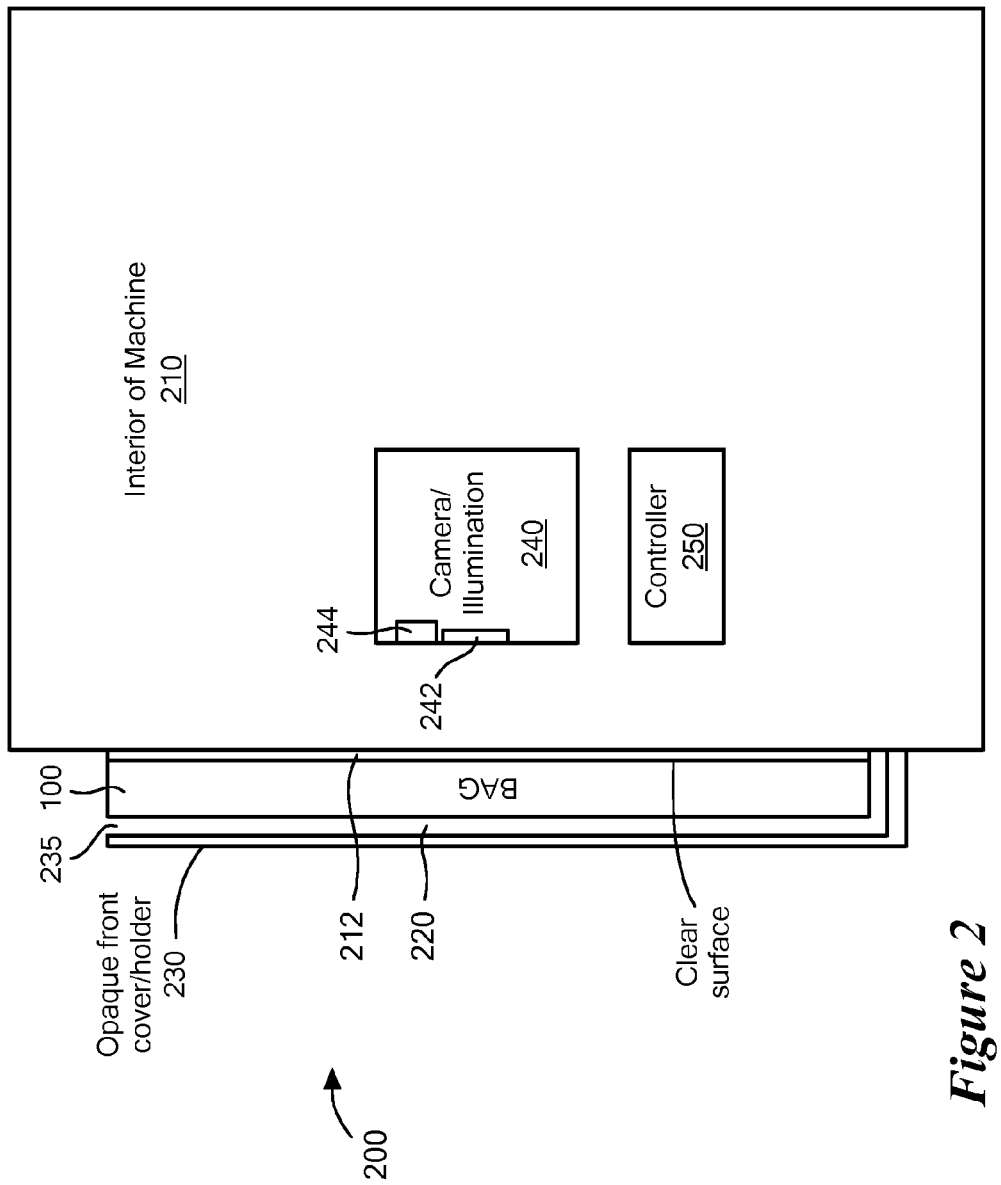
FIG. 2 schematically shows a volume and pressure measurement system with the fluid bag of FIG. 1 installed, in accordance with embodiments of the present invention.

As noted above, the fluid container 100 can be used in conjunction with a fluid volume and pressure measurement system 200 that is capable of determining the volume of fluid within each fluid chamber 120A-D and the pressure within the pressure chambers 140A-C (if the container 100 includes pressure chambers 140A-C). As shown in FIG. 2, the measurement system 200 may include a housing 210 in which the components of the system 200 may be located. The housing 200 may also include a measurement area 220 in which the container 100 may be placed during measurement and a cover 230 that holds the container 100 in place. The cover 230 may be secured to the housing 210 via a hinge to allow the cover 230 to open and close and the container 100 to be placed in the measurement area 220. Alternatively, the cover 230 may be stationary with respect to the housing 210 and may include a slot 235 through which the container 100 may be inserted into the measurement area 220. As discussed in greater detail below, the wall 212 of the housing 210 at the measurement area 220 may be clear/transparent and the cover 230 may be opaque.

In order to measure the volumes and pressures, the system 200 includes an imaging unit 240 that takes images of the container 100 through the clear wall 212 of the housing 210 when the container 100 is within the measurement area 220. To that end, the imaging unit 240 may include a solid state imager 242 with one or more cameras aimed through the clear wall 212 into the measurement area 220. Additionally, in some embodiments, the imaging unit 240 may include a light source 244 that illuminates the container 100 to allow the imaging unit 240 to image the container 100.

The light source 244 may include one or more light emitting diodes (LEDs) that illuminate the container 100. In some embodiments, the light source 244 may include an array of LEDS having varying colors (e.g., red, green, blue, etc.) to allow the imaging system 200 to illuminate the container 100 in a number of colors. In order to minimize the setback distance (e.g., the distance between the container 100 and the imaging unit 240) and the size of the system 200, the imaging unit (e.g., the solid state imager 242/camera) may have a wide angle lens.

During use, the imaging unit 240 may image the container 100 and send the images and/or image data to a controller 250, which determines the fluid volume and/or pressure based on the image/image data. For example, with respect to the fluid volume, the controller 250 may determine the volume of fluid within each of the fluid chambers 120A-D based on the fluid level within the respective fluid chamber 120A-D. To aid in determining the fluid level within each of the fluid chambers 120A-D, the container 100 may include a series of reference marks/graduations. For example, the container 100 may include one set of reference marks for the entire container 100 (e.g., all fluid chambers 120A-D may utilize the same set of marks), or each fluid chamber 120A-D may have their own set of reference marks. In addition to providing a more accurate measure of the fluid level within the fluid chambers 120A-D, the reference marks also allow the system 200 to automatically adjust and eliminate sensor (e.g., solid state imager 242) calibration.

With respect to the pressure chambers 140A-C, the system 200 may measure the pressure by monitoring the fluid level within the pressure chamber 140A-C. As mentioned above, each of the pressure chambers 140-C may be fluidly connected to a fluid line in a fluid processing system. In such a configuration, a portion of fluid flowing through the fluid line connected to the pressure chamber 140A-C will flow into the pressure chamber 140A-C and will compress the volume of air within the pressure chamber 140A-C. The amount of compression (and, therefore, the fluid level within the pressure chamber 140A-C) is directly related to the pressure within the fluid line. For example, if the pressure within the fluid line increases, the fluid will further compress the volume of air in the pressure chamber 140A-C and the fluid level will rise. Conversely, if the pressure within the fluid line drops, the amount of compression will decrease (e.g., the volume of air will expand) and the fluid level will drop. Like with the fluid chambers 120A-D, the controller 150 may then determine the pressure of the fluid within the fluid line based on the fluid level within the pressure chamber 140A-C. In some embodiments, like the fluid chambers 120A-D, the pressure chambers 140A-C may include reference marks/graduations to improve the accuracy of the level measurement.

In order to aid in the calculation/determination of the volume and/or pressure, some embodiments of the present invention may utilize look-up tables that correlate the imaged fluid level (e.g., the level of the fluid within the fluid chambers 120A-D and/or the level of fluid within the pressure chambers 140A-C) with a fluid volume in the fluid chamber 120A-D or pressure within the fluid line. For example, for a given container 100 (and/or for a given fluid processing system), the system 200 (e.g., the controller 250) may determine the level of fluid for a given chamber (e.g., using the reference marks) and then refer to the look-up table to find the fluid volume or pressure that correlates to the imaged fluid level.

Once the system 200/controller 250 has determined the fluid volume and/or pressures, the system 200 may display the volume and/or pressure on a display on the system. Additionally or alternatively, the system 200 can send the volume and pressure information to the fluid processing system for display and/or use by the fluid processing system. In some embodiments the system 200 (or the fluid processing system) may monitor the fluid volume and/or pressure to determine if the fluid volume reaches a target or threshold level. For example, if the fluid level within one of the fluid chambers 120A-D reaches a target level (e.g., indicating that a target volume of fluid has been collected in the fluid chamber 120A-D), the system 200 or the fluid processing system may stop or otherwise alter the fluid processing procedure. Similarly, if the pressure within one or more of the pressure chambers 140A-C goes above or below a threshold level (e.g., indicating that a pressure in one of the fluid lines is too high or too low), the system 200 may initiate an alarm or adjust the fluid flow within the fluid line.

Figure 3:
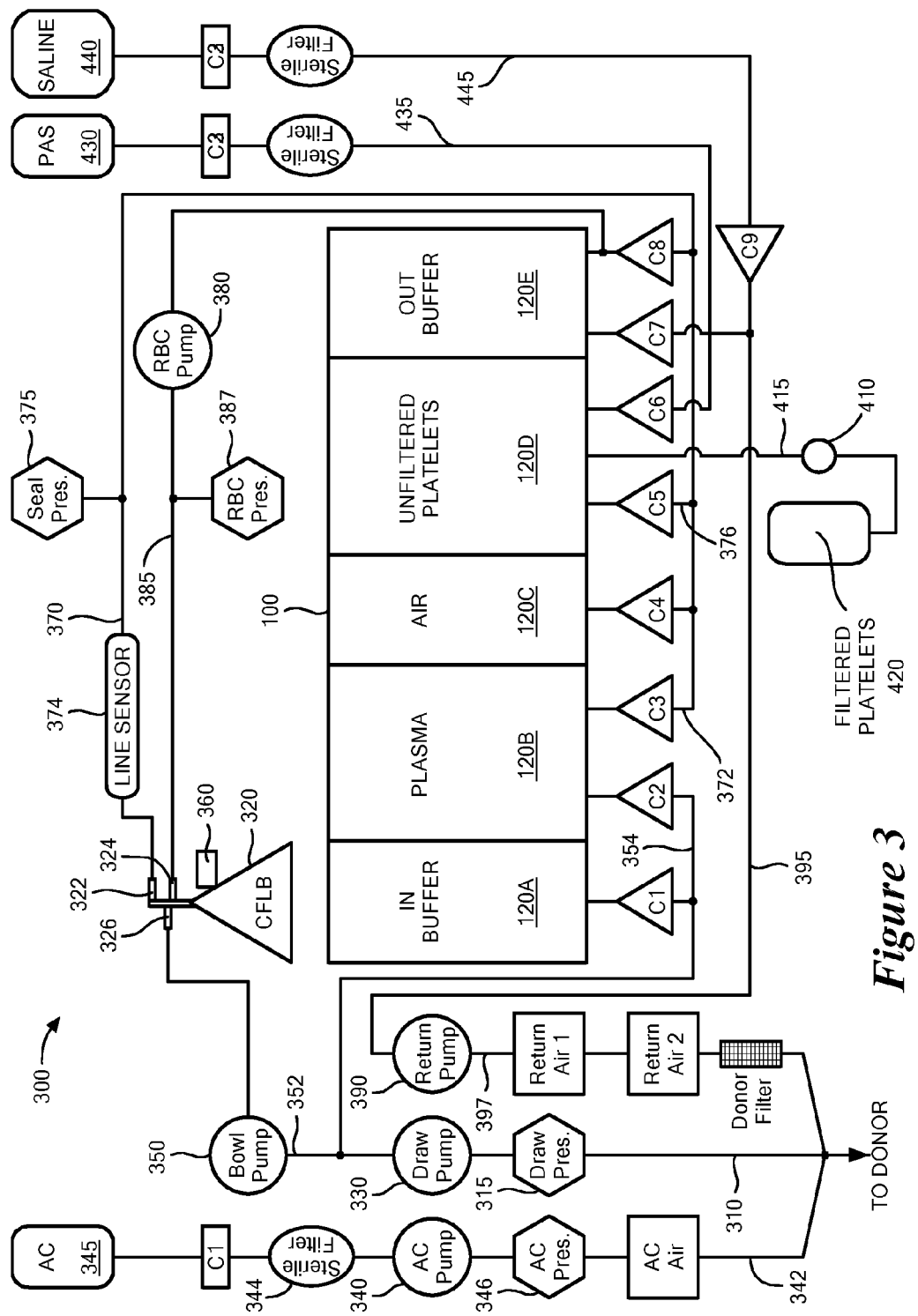
FIG. 3 schematically shows an exemplary disposable set containing a fluid container similar to that shown in FIG. 1 and for use with the volume and pressure measurement system shown in FIG. 2, in accordance with embodiments of the present invention.

FIG. 3 schematically shows a disposable set for a blood processing device utilizing a fluid container 100 and system 200 similar to that described above. It is important to note that, unlike the container 100 shown in FIG. 1 (which has three pressure chambers 140A-C and four fluid chambers 120A-D), the container 100 shown in FIG. 3 has five fluid chambers 120A-E and no pressure chambers 140A-C. Also, although FIG. 3 shows the fluid container 100 being used for blood processing, the container 100 can be used for any number of liquid processing procedures.

During blood processing, whole blood may be drawn from a source (e.g., a patient, a blood storage bag, etc.) using a donor/draw pump 330, and through a draw line 310. In some embodiments, a portion of the drawn whole blood may flow into the centrifuge bowl 320 and a portion of the whole blood may be diverted to an in-buffer/draw chamber 120A. Alternatively, all of the whole blood may be diverted to the in-buffer/draw chamber 120A and later drawn from the in-buffer/draw chamber 120A and into the bowl 320. Also, while the whole blood is being drawn from the source, an anticoagulant pump 340 may draw anticoagulant through an anticoagulant line 342 and filter 344 from an anticoagulant source 345. The anticoagulant may mix with the drawn whole blood prior to reaching the in-buffer/draw chamber 120A and/or the bowl 320. To make room for the whole blood entering the bowl 320, the air within the bowl 320 may be displaced via an outlet 322 and line 370 to an air chamber 120C of the container 100.

Once the initial draw step has commenced and a sufficient amount of anticoagulated whole blood is collected in the in-buffer/draw chamber 120A, a bowl pump 350 may begin to draw anticoagulated whole blood from the in-buffer/draw chamber 120A via line 352. As the bowl pump 350 draws the anticoagulated whole blood from the in-buffer/draw chamber 120A, valves (not shown) may be opened to allow the anticoagulated whole blood to flow into line 352. In order to ensure that a sufficient volume of anticoagulated whole blood remains within the in-buffer/draw chamber 120A (e.g., to maintain a continuous flow of anticoagulated whole blood to the bowl 320), the bowl pump 350 may draw the anticoagulated whole blood from the in-buffer/draw chamber 120A at a rate slower than that of the donor pump 330. For example, the bowl pump 350 may draw at a rate of 60 mL/min as compared to the donor pump's rate of 120 mL/min. The bowl 320 will continue to fill until an optical system 360 detects the presence of a plasma/cell interface created by the separation of the whole blood within the bowl 320.

As additional anticoagulated whole blood is introduced into the bowl 320, the whole blood will continue to separate. For example, the centrifugal forces cause the heavier cellular components of the blood to sediment from the lighter plasma component of the blood. This results in the cell/plasma interface mentioned above. The red blood cells are by far the most numerous of the cellular components of blood and the most dense, resulting in a layer of concentrated red blood cells at the outermost diameter of the bowl 320. As filling continues, the other cellular components of blood begin to become apparent. These cellular components are primarily platelets, leukocytes and peripheral hematopoietic progenitor stem cells. These cells may have a range of densities between that of the red blood cells and plasma. Therefore they tend to sediment in a layer between the red blood cell layer and plasma layer. As this layer grows, it is visually apparent as a solid white layer which is known as a buffy coat.

As the bowl 320 continues to fill with whole blood, the red blood cells will continue to sediment to the outermost diameter, and the intermediate cells of the buffy coat will continue to accumulate at the red blood cell/plasma interface, and the plasma interface will move inward towards the center of the bowl 320. When the bowl 320 is full, the plasma will exit the bowl 320 via the outlet 322. As the plasma exits the bowl 320, some of the plasma may pass through line 370 and into an out buffer chamber 120E of the container 100 and some of the plasma may be sequestered within the plasma chamber 120B of the container 100. To sequester this plasma in the plasma chamber 120B, the operator or the control system of the blood processing system can open valve C3 to allow some of the plasma exiting the bowl 320 to enter line 372 and flow into the plasma chamber 120B. The sequestered plasma in the plasma chamber 120B may be used during a surge elutriation procedure to remove the platelets from the bowl 320.

In some embodiments, the bowl 320 may be a continuous flow bowl that allows the continuous processing of whole blood without the need to intermittently stop. To that end, various embodiments of the present invention also extract red blood cells from the bowl 320 as additional whole blood is introduced (e.g., while simultaneously extracting plasma). For example, once the red blood cells have collected within the bowl 320, a red blood cell pump 380 can draw red blood cells out of an additional output 324 (e.g., a first blood component/red blood cell outlet) on the bowl 320. As the red blood cells leave the bowl 320, they will pass through line 385 and into the out buffer chamber 120E (e.g., which acts as a return chamber). While the red blood cell pump 380 extracts the red blood cells, the optical system 360 will monitor the location of the plasma/cell interface and may control the flow rate of the red blood cell pump 380 to adjust the location of the interface as necessary (e.g., it will speed up the pump 380 if the sensor output decreases and slow down the pump 380 if the sensor output increases).

Once the donor pump 330 has drawn a predetermined volume of whole blood from the source, the system 300 will stop the draw step and begin to return some of the blood components (e.g., red blood cells and plasma) that have been collected in the out buffer/return chamber 120E. For example, the system 300 may energize a return pump 390, which will draw (e.g., at 120 mL/min) the plasma and red blood cells within the out buffer/return chamber 120E through line 395, and back to the source (e.g., back to the patient). This return phase will continue until a predetermined volume of red blood cells and plasma are returned to the subject, for example, 80 mL. The system 300 may then alternate the draw and return phases until the procedure is complete. In some embodiments, a compensation fluid such as saline may be returned to the patient along with the blood components within the out buffer/return chamber 120E. In such embodiments, the return pump 390 may draw the compensation fluid from a container 440 and through a compensation line 445.

In continuous systems like that shown in FIG. 3, anticoagulated whole blood may be continuously drawn from the in-buffer/draw chamber 120A and into the bowl 320, even during the return phase. As mentioned above, this can be accomplished by first drawing a bolus volume of whole blood from the subject, collecting the bolus volume of whole blood within the in-buffer/draw chamber 120A, and drawing the whole blood from the in-buffer/draw chamber 120A at a slower rate than the draw and return steps (e.g., the bowl pump 350 draws the anticoagulated whole blood at 60 mL/min and the donor pump 330 draws the whole blood from the subject and returns the red blood cells and plasma to the subject at 120 mL/min). Therefore, the in-buffer/draw chamber 120A always has a sufficient volume of anticoagulated whole blood from which the bowl pump 350 can draw.

The whole blood processing may continue until a desired volume of platelets has accumulated within the bowl 320. When the blood processing is complete, the system 300 may then perform a surge elutriation process using the sequestered plasma in order to extract the highly concentrated platelet product. For example, the bowl pump 350 can draw the plasma within the plasma chamber 120B through a plasma recirculation line 354 and into the bowl 320 (e.g., via the inlet 326). To elutriate the platelets, the flow rate of plasma is gradually increased. As the flow rate is increased, the effluent plasma passes through a line sensor 374 (located on line 370) that monitors the fluid exiting the bowl 320. At some point in this ramping up of plasma flow rate, the drag force created by the plasma flow overcomes the centrifugal force caused by the bowl rotation, and the platelets are carried away from the buffy coat in the flowing plasma. The line sensor 374 may then detect the presence of cells (e.g., as the fluid exiting the bowl 320 changes from plasma to platelets), and the system 300 (or the user) can close valve C3 and open valve C5 to allow the platelets to flow into the platelet line 376 and into the platelet chamber 120D of the container 100.

After the elutriation process and after the platelets are collected within the platelet chamber 120D, the system 300 may stop the bowl 320 and return the contents of the bowl 320 to the donor. For example, the system 300 may turn on the red blood cell pump 380 to draw the contents of the bowl 320 into the out buffer/return chamber 120E (via line 385). The return pump 390 may then draw the contents of the out buffer/return chamber 120E through line 395, and return the components via the return line 397. Additionally, in some applications, platelet additive solution may be added to the platelets within the platelet chamber 120D (from platelet additive solution container 430 and via line 435 and valve C6), and the platelets may be filtered using a platelet filter 410 and transferred to a filtered platelet container 420 via line 415.

Throughout the blood processing procedure, the vision system 200 can monitor the fluid levels in each of the chambers 120A-E in manner similar to that described above. For example, as the plasma enters or is drawn from the plasma chamber 120B, platelets enter/are drawn from the platelets chamber 120D, and when plasma and/or red blood cells enter/are drawn from the out buffer/return chamber 120E, the vision system 200 can monitor the volumes collected and/or remaining in each of the chambers 120A-E. Additionally, the vision system 200 may monitor the level of whole blood within the in-buffer/draw chamber 120A to ensure that the in-buffer/draw chamber 120A contains sufficient whole blood to continuously supply the bowl 320 with whole blood. The blood processing system 300 may then use this information to adjust/alter/control the blood processing procedure. For example, the blood processing system 300 can control the pumps, centrifuge bowl 320, valves, or other components of the system based upon the volumes.

Figure 4:
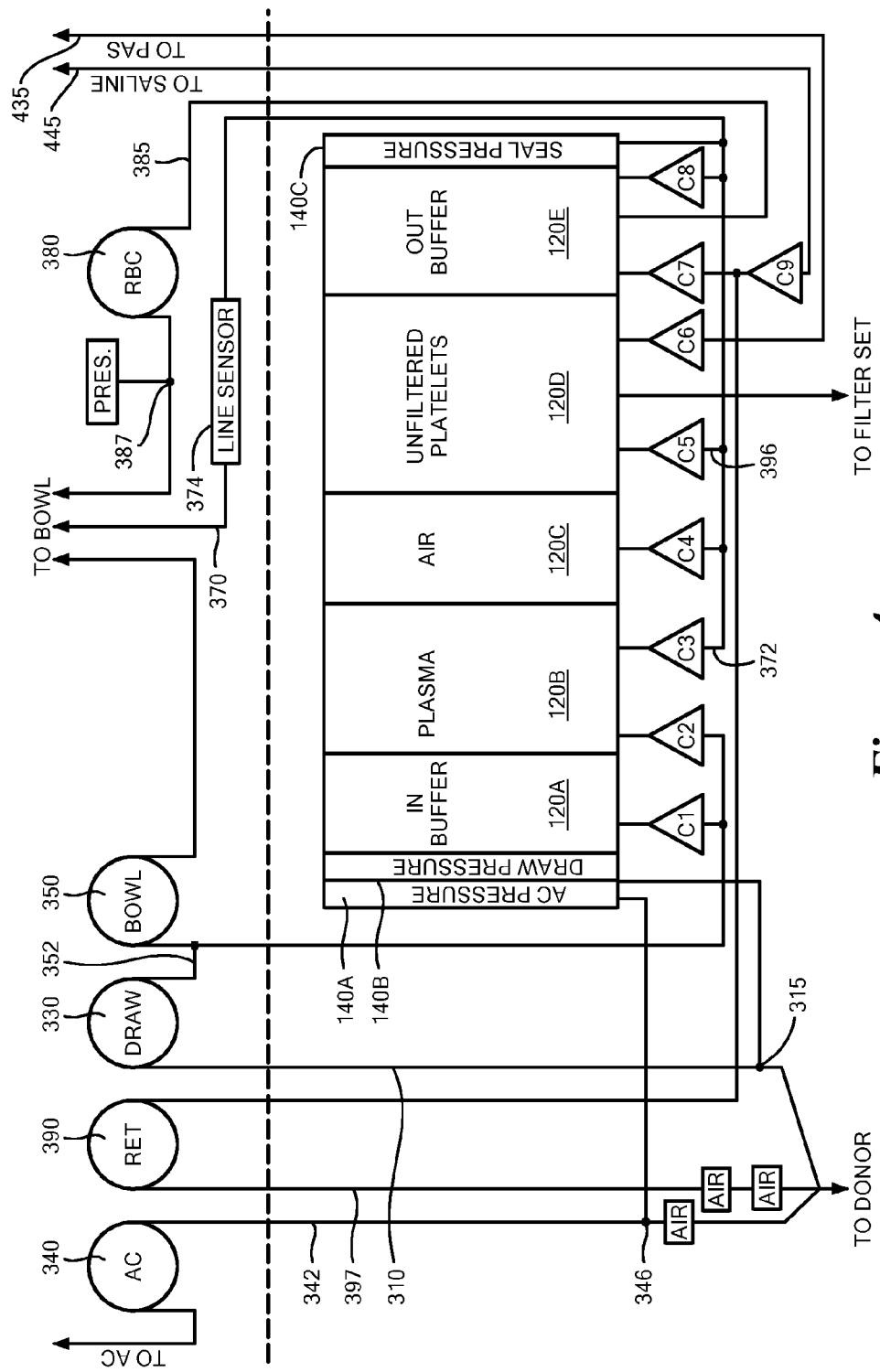
FIG. 4 schematically shows an exemplary layout of a blood processing system for use with the volume and pressure measurement system shown in FIG. 2, in accordance with embodiments of the present invention.

Although FIG. 3 illustrates a blood processing system 300 utilizing a container 100 without pressure chambers, as noted above, other embodiments may include pressure chambers to allow the vision system 200 and/or the blood processing system to measure the pressures within one or more of the fluid lines. For example, FIG. 4 shows a layout of the blood processing system 300 with a container 100 with five fluid chambers 120A-E (like the container shown in FIG. 3), and three pressure chambers 140A-C. It should be noted that the operation of the blood processing system 300 is similar to that shown in FIG. 3 (including the roles of each of the fluid chambers 120A-E) and described above.

As shown in FIG. 4, an anticoagulant pressure chamber 140A may connect to the anticoagulant line 342 at pressure connection 346. Similarly, a draw pressure chamber 140B may connect to the draw line 310 at pressure connection 315, and a seal pressure chamber 140C may connect to line 370 extending from outlet 322 at pressure connection 375 (see FIG. 3). It should be noted that, although the embodiment shown in FIG. 4 does not include a pressure chamber connected to the red blood cell pressure connection 387 (e.g., it uses a standard pressure transducer to measure the pressure within the red blood cell line 385), other embodiments can include a fourth pressure chamber that is connected to the red blood cell line 385 at pressure connection 387.

During blood processing, a portion of the fluid in each of the fluid lines (e.g., the anticoagulant line 342, the draw line 310, and line 370) will enter the pressure chambers 140A-C and cause the volume of air within each of the chambers 140A-C to compress. Then, as the pressure within each of the lines 310/341/370 changes, the pressure change will be translated to the pressure chambers 140A-C, causing the volume of air in the chambers 140A-C to compress further if the pressure increases and/or expand if the pressure decreases (e.g., the fluid level within the chambers 140A-C will move up and/or down). The vision system 200 may then monitor the fluid level within each of the chambers 140A-C and determine the respective pressure within the connected line (e.g., within lines 342, 310 and 370). The system 200 may then send this pressure information to the blood processing system 300 (e.g., to a controller within the blood processing system 300) along with the fluid volume information determined from the fluid chambers 120A-E. The blood processing system 300 may then adjust/alter/control the blood processing procedure. For example, the blood processing system 300 can control the pumps, centrifuge bowl 320, valves, or other components of the system based upon the measured pressures (and/or volumes).

It should be noted that, although the blood processing method discussed above draws whole blood from and returns the contents of the bowl to a donor, some embodiments may not draw from and/or return to a donor. Rather, in some embodiments, the whole blood may be drawn from a whole blood storage container, and the contents of the bowl 320 may be returned to the whole blood storage container (or a different blood storage container).

It is important to note that, in addition to providing an accurate volume and pressure measurement, embodiments of the present invention provide additional benefits over prior art containers and pressure/volume measurement system. For example, because the container 100 includes individual chambers 120A-D for a number of fluids collected and used during fluid processing, the container 100 may be installed as a single piece as opposed to several separate containers. This, in turn, simplifies installation/loading and reduces installation/loading time. Additionally, by adding additional chambers to the container 100, embodiments of the present invention are able to further reduce the complexity of the fluid processing system (e.g., the blood processing system 300), system calibration, and cost, while increasing reliability.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A volume measurement system for a fluid processing device comprising:
   a fluid container including:
      a fluid container housing defining the structure of the fluid container; and
      a plurality of fluid chambers within the fluid container housing and configured to collect and/or store fluid from the fluid processing device, each of the plurality of fluid chambers having a port configured to allow fluid to enter or exit each of the fluid chambers;
   an imaging unit configured to take images of the plurality of fluid chambers and positioned to view a level of fluid in each of the plurality of fluid chambers; and
   a controller in communication with the imaging unit and configured to determine a volume of fluid within each of the plurality of fluid chambers based upon the viewed level of fluid in each of the plurality of fluid chambers;
   wherein the fluid container further includes a plurality of pressure chambers within the fluid container housing, each of the pressure chambers having a chamber volume that is fluidly connectable with a fluid flow line within the fluid processing device, a pressure within the fluid flow line configured to compress the chamber volume when fluidly connected.

2. The system according to claim 1, wherein each of the plurality of pressure chambers includes a tube having an open end and a closed end and defining the chamber volume, the chamber volume fluidly connectable with the fluid flow line via the open end.

3. The system according to claim 2, wherein an inner diameter of the tube is dependent on a target pressure range for the pressure chamber.

4. The system according to claim 1, wherein the imaging unit is further configured to take images of the plurality of pressure chambers, the controller further configured to determine a pressure level within each of the plurality of pressure chambers based on the image of the pressure chambers.

5. The system according to claim 1, wherein the controller uses a look-up table to determine the pressure level within each of the plurality of pressure chambers.

6. The system according to claim 1, wherein the fluid container housing includes:
   a first sheet of flexible material; and
   a second sheet of flexible material, the first sheet of flexible material being secured to the second sheet of flexible material to form the plurality of fluid chambers.

7. The system according to claim 6, wherein the first and second sheets of flexible material are PVC.

8. The system according to claim 1, wherein the housing includes a plurality of reference marks on each of the fluid chambers, the reference marks providing an indication of a fluid level in each of the fluid chambers.

9. The system according to claim 8, wherein the fluid level is related to a volume of fluid within the fluid chamber.

10. The system according to claim 1, wherein the controller uses a look-up table to determine the volume of fluid within each of the plurality of fluid chambers.

11. The system according to claim 1, wherein the fluid container includes perforations configured to allow the fluid chambers to be separated from one another.

12. The system according to claim 1, wherein at least one of the plurality of fluid chambers is V-shaped.

13. The system according to claim 1, further comprising:
   a system housing defining the structure of the volume measurement system, the imaging unit and controller located within the housing, at least a portion of a first wall of the system housing being transparent to allow the imaging unit to view the fluid container and take the images.

14. The system according to claim 13, further comprising an opaque cover, the fluid container located between the opaque cover and the first wall when installed in the volume measurement system.

15. The system according to claim 14, wherein the opaque cover holds the fluid container in place when closed.

16. The system according to claim 1, wherein the imaging unit includes:
   a camera configured to take the images of the plurality of fluid chambers; and
   a light source directed at the fluid container and configured to illuminate the plurality of fluid chambers, thereby allowing the camera to take the images of the plurality of fluid chambers.

17. The system according to claim 1, wherein the controller is part of the fluid processing device.

18. The system according to claim 1, wherein the imaging unit is a solid state imager.

19. The system according to claim 1, wherein the imaging unit includes a wide angle lens.

20. The system according to claim 1, wherein the imaging unit and controller are part of the fluid processing device.

21. A method of measuring a volume of fluid within a fluid container comprising:
   providing a fluid container, the fluid container comprising:
      a fluid container housing defining the structure of the fluid container;
      a plurality of fluid chambers within the fluid container housing and configured to collect and/or store fluid from the fluid processing system, each of the plurality of fluid chambers having a port configured to allow fluid to enter or exit each of the fluid chambers, and
      a plurality of pressure chambers within the housing and having chamber volumes;
   fluidly connecting each of the plurality of fluid chambers to a fluid line on the fluid processing system via the port;
   installing the fluid container into a volume measurement device, the volume measurement device having an imaging unit configured to take images of the plurality of fluid chambers and positioned to view a level of fluid in each of the plurality of fluid chambers;
   imaging each of the plurality of fluid chambers using the imaging unit;
   determining, using a controller in communication with the imaging unit, a volume of fluid within each of the plurality of fluid chambers based upon the images of the fluid chambers; and
   fluidly connecting each of the pressure chambers to a fluid flow line within the fluid processing system, a pressure within the fluid flow line configured to compress the chamber volume.

22. The method according to claim 21, further comprising:
   imaging each of the plurality of pressure chambers using the imaging unit;
   determining, using the controller, a pressure level within each of the plurality of pressure chambers based on an image of the pressure chambers.

23. The method according to claim 22, wherein each of the plurality of pressure chambers includes a tube having an open end and a closed end, the tube defining the chamber volume, the chamber volume in fluid communication with the fluid flow line via the open end.

24. The method according to claim 23, wherein an inner diameter of the tube is dependent on a target pressure range for the pressure chamber.

25. The method according to claim 22, wherein the controller uses a look-up table to determine the pressure level within each of the plurality of pressure chambers.

26. The method according to claim 21, wherein the fluid container housing includes:
   a first sheet of flexible material; and
   a second sheet of flexible material, the first sheet of flexible material being secured to the second sheet of flexible material to form the plurality of fluid chambers.

27. The method according to claim 26, wherein the first and second sheets of flexible material are PVC.

28. The method according to claim 21, wherein the housing includes a plurality of reference marks on each of the fluid chambers, the reference marks providing an indication of a fluid level in each of the fluid chambers.

29. The method according to claim 28, wherein the fluid level is related to a volume of fluid within the fluid chamber.

30. The method according to claim 21, wherein the volume measurement device includes a system housing defining the structure of the volume measurement device, the imaging unit and controller located within the housing, at least a portion of a first wall of the system housing being clear to allow the imaging unit to view the fluid container and take the images.

31. The method according to claim 30, the system housing further comprising an opaque cover, wherein installing the fluid container into the volume measurement device includes closing the opaque cover over the fluid container to secure the fluid container within the volume measurement device.

32. The method according to claim 21, wherein the imaging unit includes:

a camera configured to take the images of the plurality of fluid chambers; and a light source directed at the fluid container and configured to illuminate the plurality of fluid chambers, thereby allowing camera to take the images of the plurality of fluid chambers.

33. The method according to claim 21, wherein the imaging unit is a solid state imager.

34. The method according to claim 21, wherein the imaging unit includes a wide angle lens.

35. The method according to claim 21, wherein the volume measurement device is part of the fluid processing system.

36. The method according to claim 21, wherein the fluid container further includes a plurality of pressure chambers within the housing and having chamber volumes.

37. A fluid container for a fluid processing system comprising:

a housing defining the structure of the fluid container;

a plurality of fluid chambers within the housing and configured to collect and/or store fluid from the fluid processing system, each of the plurality of fluid chambers having a port configured to allow fluid to enter or exit each of the fluid chamber and provide fluid communication with a valve, wherein a plurality of the valves are connected to a common line through which fluid is pumped; and a plurality of pressure chambers within the housing, each of the pressure chambers having a chamber volume fluidly connectable with a fluid flow line within the fluid processing system, a pressure within the fluid flow line compressing the chamber volume when fluidly connected;

wherein the housing includes a first sheet of flexible material and a second sheet of flexible material, the first sheet of flexible material being secured to the second sheet of flexible material to form the plurality of fluid chambers and plurality of pressure chambers; and wherein the housing includes a plurality of reference marks on fluid chambers for providing an indication of a fluid level, and the fluid level in the fluid chamber is related to a volume of fluid within the fluid chamber.

38. The fluid container according to claim 37, wherein each of the plurality of pressure chambers includes a tube having an open end and a closed end and defining the chamber volume, the chamber volume in fluid communication with the fluid flow line via the open end.

39. The fluid container according to claim 38, wherein an inner diameter of the tube is dependent on a target pressure range for the pressure chamber.

40. The fluid container according to claim 37, wherein the first and second sheets of flexible material are PVC.

41. The fluid container according to claim 37, wherein at least one of the plurality of fluid chambers is V-shaped.

* * * * *